United States Patent
Ito

(10) Patent No.: US 6,453,253 B1
(45) Date of Patent: Sep. 17, 2002

(54) IMPULSE RESPONSE MEASURING METHOD

(75) Inventor: Tsugio Ito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/377,024

(22) Filed: Aug. 18, 1999

(30) Foreign Application Priority Data

Aug. 20, 1998 (JP) .......................................... 10-250442

(51) Int. Cl.$^7$ .............................................. G01R 23/16

(52) U.S. Cl. .......................................... 702/77; 381/59

(58) Field of Search .............................. 702/77, 57, 67, 702/70, 75, 76, 79, 112, 124, 125, 126; 381/300, 306, 307, 26, 58, 59, 60

(56) References Cited

U.S. PATENT DOCUMENTS 5,694,474 A * 12/1997 Ngo et al. ..................... 381/66
6,269,166 B1 * 7/2001 Matsuo et al. .............. 381/310

FOREIGN PATENT DOCUMENTS

JP 6324689 11/1994

\* cited by examiner

*Primary Examiner*—Marc S. Hoff
*Assistant Examiner*—Edward Raymond
(74) *Attorney, Agent, or Firm*—Pillsbury Winthrop LLP

(57) ABSTRACT

An impulse response measuring method uses an echo chamber in which a speaker and a microphone are arranged. The speaker produces measured sounds, used for measurement of impulse response, which are detected by the microphone. The microphone produces sound signals corresponding to the measured sounds. An analysis device calculates impulse response of the echo chamber based on the sound signals. Then, the impulse response is subjected to Fourier transform to produce complex data consisting of real parts and imaginary parts with respect to an axis of frequency. The real parts and imaginary parts of the complex data are respectively subjected to smoothing processes to produce average data, which are combined together to form smoothed complex data. The smoothed complex data are subjected to inverse Fourier transform to produce anechoic-chamber-equivalent impulse response, which is a simulated impulse response of an anechoic chamber substantially corresponding to the impulse response actually measured in the echo chamber.

13 Claims, 10 Drawing Sheets

FIG.4
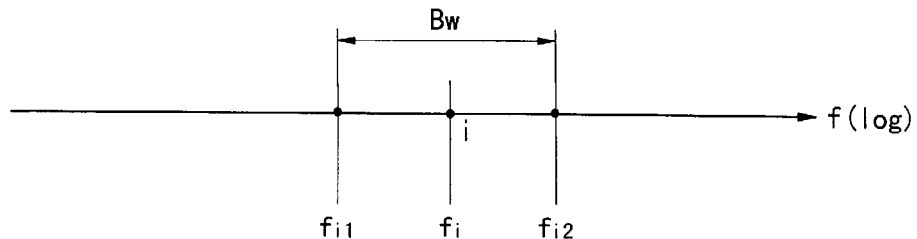
FIG.5A
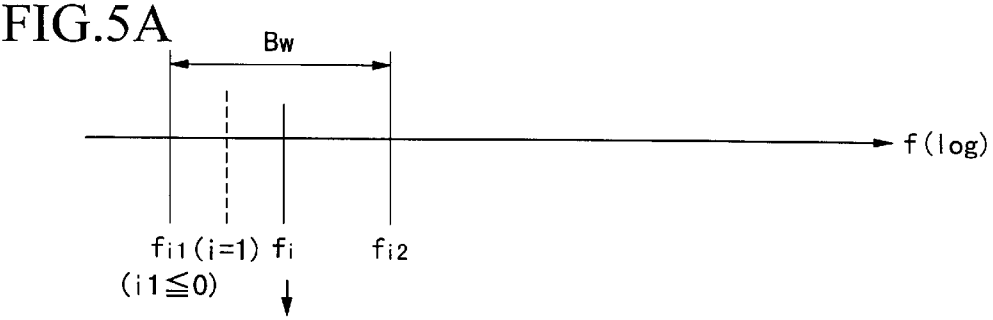
FIG.5B
FIG.6A
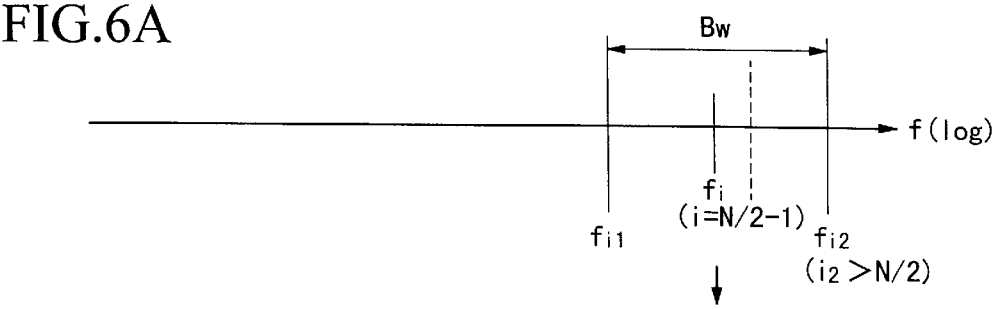
FIG.6B

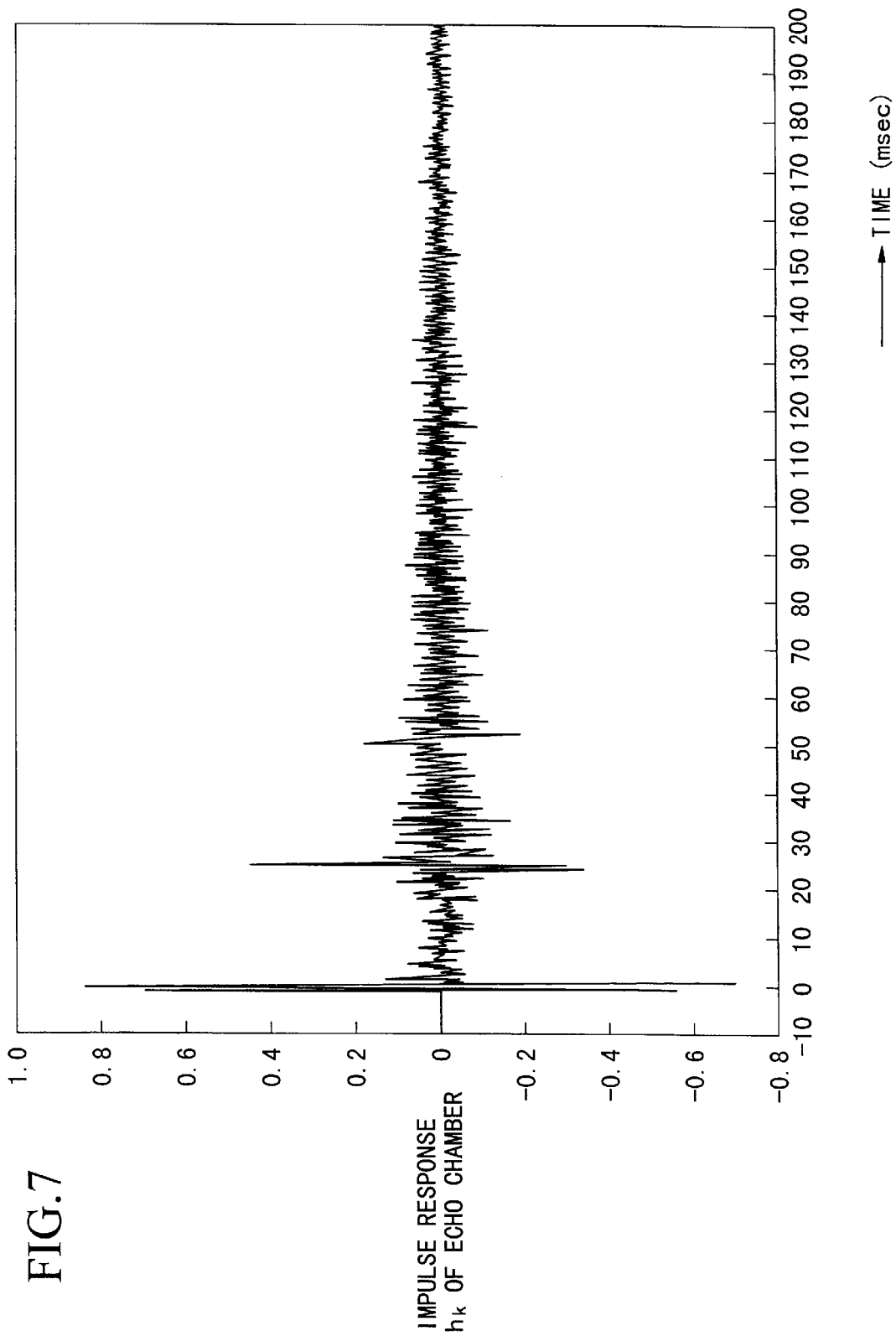

REAL PART Re(H'ₖ) OF
SMOOTHED COMPLEX DATA
(Bw=1/6 OCTAVE BANDWIDTH)

ANECHOIC-CHAMBER-EQUIVALENT IMPULSE RESPONE $h_{k0}$, WHICH IS OBTAINED BY PERFORMING INVERSE FOURIER TRANSFORM ON SMOOTHED COMPLEX DATA $H'_k$

IMPULSE RESPONSE MEASURING METHOD

BACKGROUND OF THE INVENTION

1. Field of the Invention

This invention relates to impulse response measuring methods that produce impulse responses of anechoic chambers from impulse responses measured in echo chambers.

This application is based on Patent Application No. Hei 10-250442 filed in Japan, the content of which is incorporated herein by reference.

2. Description of the Related Art

Impulse responses of electroacoustic transducers (or electroacoustic converters) such as speakers and microphones should be originally measured in anechoic chambers to avoid effects due to echo and reverberation. However, it is not easy to construct the echo chambers. For this reason, it is necessary for engineers (or scientists) to carry measuring objects to the place where the echo chamber is located. However, it is difficult to perform measurement on "immovable" embedded speakers, which cannot be moved with ease, in the echo chamber.

The aforementioned problem can be eliminated if an impulse response (hereinafter referred to as anechoic-chamber-equivalent impulse response), which is equivalent to an impulse response measured in the anechoic chamber, can be obtained from an impulse response actually measured in the echo chamber. The paper of Japanese Patent Application, Publication No. Hei 6-324689 discloses a method that produces the anechoic-chamber-equivalent impulse response from the impulse response of the echo chamber. This method produces the anechoic-chamber-equivalent impulse response by eliminating reverberation components from the impulse response actually measured in the echo chamber. This is actualized by extracting a part of a waveform of the impulse response prior to a first echo, such as a part of the waveform measured for two milliseconds or so after generation of a test pulse.

There is another method that uses kepstrum analysis. In general, reverberation components exist in the impulse responses measured in the echo chambers. As a result, comb characteristics emerge in transfer characteristics. In the comb characteristic, peak dips emerge on the transfer function on its axis of frequency at equal intervals. Kepstrum process is a mathematical calculation method to analyze, detect and eliminate components of notable periods in the characteristic. Concretely speaking, the kepstrum process uses results of Fourier transform, which is performed on logarithmic power spectrum of the transfer characteristic.

The aforementioned method that extracts and uses the part of the waveform of the measured impulse response prior to the first echo is disadvantageous because the characteristics below the frequency of 500 Hz (½ milli-second in the time domain) become unclear, so impulse response cannot be accurately measured with respect to the measured object.

In addition, the method using the kepstrum analysis is computationally complicated and therefore has a drawback that the processing time is long.

SUMMARY OF THE INVENTION

It is an object of the invention to provide an impulse response measuring method that has a high accuracy in calculations of anechoic-chamber-equivalent impulse responses based on impulse responses measured in echo chambers.

An impulse response measuring method of this invention uses an echo chamber in which a speaker and a microphone are arranged. The speaker produces measured sounds, used for measurement of impulse response, which are detected by the microphone. The microphone produces sound signals corresponding to the measured sounds. Impulse response of the echo chamber is calculated based on the sound signals with respect to an axis of time. Then, the impulse response is subjected to Fourier transform to produce complex data consisting of real parts and imaginary parts with respect to an axis of frequency. The real parts and imaginary parts of the complex data are respectively subjected to smoothing processes to produce average data, which are combined together to form smoothed complex data. The smoothed complex data are subjected to inverse Fourier transform to produce anechoic-chamber-equivalent impulse response, which is a simulated impulse response of an anechoic chamber substantially corresponding to the impulse response actually measured in the echo chamber.

If the Fourier transform is directly performed on the impulse response of the echo chamber, which has a characteristic with respect to the axis of time, to produce a transfer function, a characteristic containing reverberation components emerges with respect to the axis of frequency. So, the transfer function has a so-called comb characteristic. This invention is characterized by eliminating or reducing such a comb characteristic by smoothing the complex data, which are obtained from the impulse response of the echo chamber. That is, the impulse response of the echo chamber is converted to the complex data with respect to the axis of frequency, so the complex data are smoothed and are then re-converted to restore the original characteristic with respect to the axis of time. As compared with the conventional method, this invention does not require limitation of a time range used for sampling of impulse response. Therefore, it is possible to maintain characteristics of low-frequency components, so it is possible to obtain anechoic-chamber-equivalent impulse response with accuracy.

The smoothing processes are performed with respect to a prescribed frequency range on the axis of frequency, in which a number of frequency points are set at equal intervals, each of which is set in response to a constant frequency difference or constant frequency ratio, for example. Herein, average data are produced respectively with respect to the real parts and imaginary parts of the complex data belonging to a prescribed bandwidth which is set before and after each one frequency point to include multiple frequency points. Thus, the average data are substituted for original data of each one frequency point. Such averaging calculations and substitution are performed with respect to each of the frequency points in the prescribed frequency range.

Mathematically, the smoothing processes independently performed on the real parts and imaginary parts of the complex data are equivalent to the averaging process of the complex data. However, in an aspect of a configuration of the processing circuit(s) and an architecture of the program (s), the aforementioned "independent" smoothing processes are useful because the system configuration can be simplified by repeatedly using the same processing structure or same processing routine. Incidentally, the aforementioned bandwidth can be set such that each one frequency point whose data are substituted substantially corresponds to a center frequency of the bandwidth.

In addition, it is possible to change a bandwidth located in proximity to a lowest frequency of the frequency range used for the calculations of the average data. That is, it is possible to narrow such a bandwidth whose lower-limit frequency is lower than the lowest frequency of the frequency range such that the lower-limit frequency of the bandwidth is fixed at the lowest frequency of the frequency range or a frequency point slightly higher than the lowest frequency of the frequency range, while each one frequency point whose data are substituted substantially coincides with a center frequency of the bandwidth. Further, it is possible to change a bandwidth located in proximity to a highest frequency of the frequency range. That is, it is possible to narrow such a bandwidth whose upper-limit frequency is higher than the highest frequency of the frequency range such that the upper-limit frequency of the bandwidth is fixed at the highest frequency of the frequency range or a frequency point slightly lower than the highest frequency of the frequency range, while each one frequency point whose data are substituted substantially coincides with a center frequency of the bandwidth. By narrowing the aforementioned bandwidths, it is possible to prevent "meaningless" data out of the frequency range from being used in the calculations for producing the average data.

Furthermore, the frequency range used for the calculations of the average data is divided to ranges with respect to the axis of frequency. Herein, a first range lies between a first frequency point corresponding to zero frequency and a second frequency point corresponding to a half of a sampling frequency used for the measurement of the impulse response in the echo chamber, while a second range lies between the second frequency point and a third frequency point corresponding to the sampling frequency. Using the symmetry of the complex data, the complex data which are calculated and smoothed with respect to one of the first and second ranges are used for another one of the first and second ranges. That is, the smoothing processes are performed with respect to all the frequency range by repeatedly using the complex data regarding one of the two ranges. Thus, it is possible to reduce the frequency range actually used for the calculations to one half, so it is possible to reduce load in calculations of operation circuits of the system.

The anechoic-chamber-equivalent impulse response obtained through the method of this invention is used as the impulse response of the speaker or microphone. It can be also used for evaluation of characteristics containing the phase characteristic of the speaker or microphone as well as the rise characteristic and fall characteristic. In addition, the aforementioned impulse response can be used for design of the filter characteristic to correct the characteristic of the speaker or microphone to desired one. To cope with reproduction of sounds which are recorded by the binaural recording and a reproduced by speakers, it is necessary to provide four kinds of impulse responses as basic data mutually with respect to the left and right speakers and the two microphones respectively located in the left and right ears of the dummy head being located in the anechoic chamber, which is very troublesome. However, this invention is capable of offering the basic data based on the measurement of impulse responses in the echo chamber with ease.

BRIEF DESCRIPTION OF THE DRAWINGS

These and other objects, aspects and embodiment of the present invention will be described in more detail with reference to the following drawing figures, of which:

FIG. 4 shows a bandwidth $B_w$ in which the smoothing process is performed;

FIG. 5A shows a bandwidth B, in case of $i_1 \leq 0$ in proximity to a lowest frequency of a frequency range used for calculations of average data;

FIG. 5B shows a narrow bandwidth $B_w'$ which is narrowed as compared with the bandwidth $B_w$ and is set in case of $i_1=1$ in proximity to the lowest frequency of the frequency range used for the calculations of the average data;

FIG. 6A shows a bandwidth $B_w$ in ease of $i_2 \leq N/2$ in proximity to a highest frequency of the frequency range used for the calculations of the average data;

FIG. 6B shows a narrow bandwidth $B_w'$ which is narrowed as compared with the bandwidth $B_w$ and is set in case of $i_2=N/2-1$ in proximity to the highest frequency of the frequency range used for the calculations of the average data;

FIG. 7 is a graph showing an example of impulse response $h_k$ measured in the anechoic chamber in experiments which are performed using the system of FIG. 2 in accordance with processes and operations described in conjunction with FIGS. 1, 3, 4, 5A, 5B, 6A and 6B;

DESCRIPTION OF THE PREFERRED EMBODIMENT

This invention will be described in further detail by way of examples with reference to the accompanying drawings.

Figure 2:
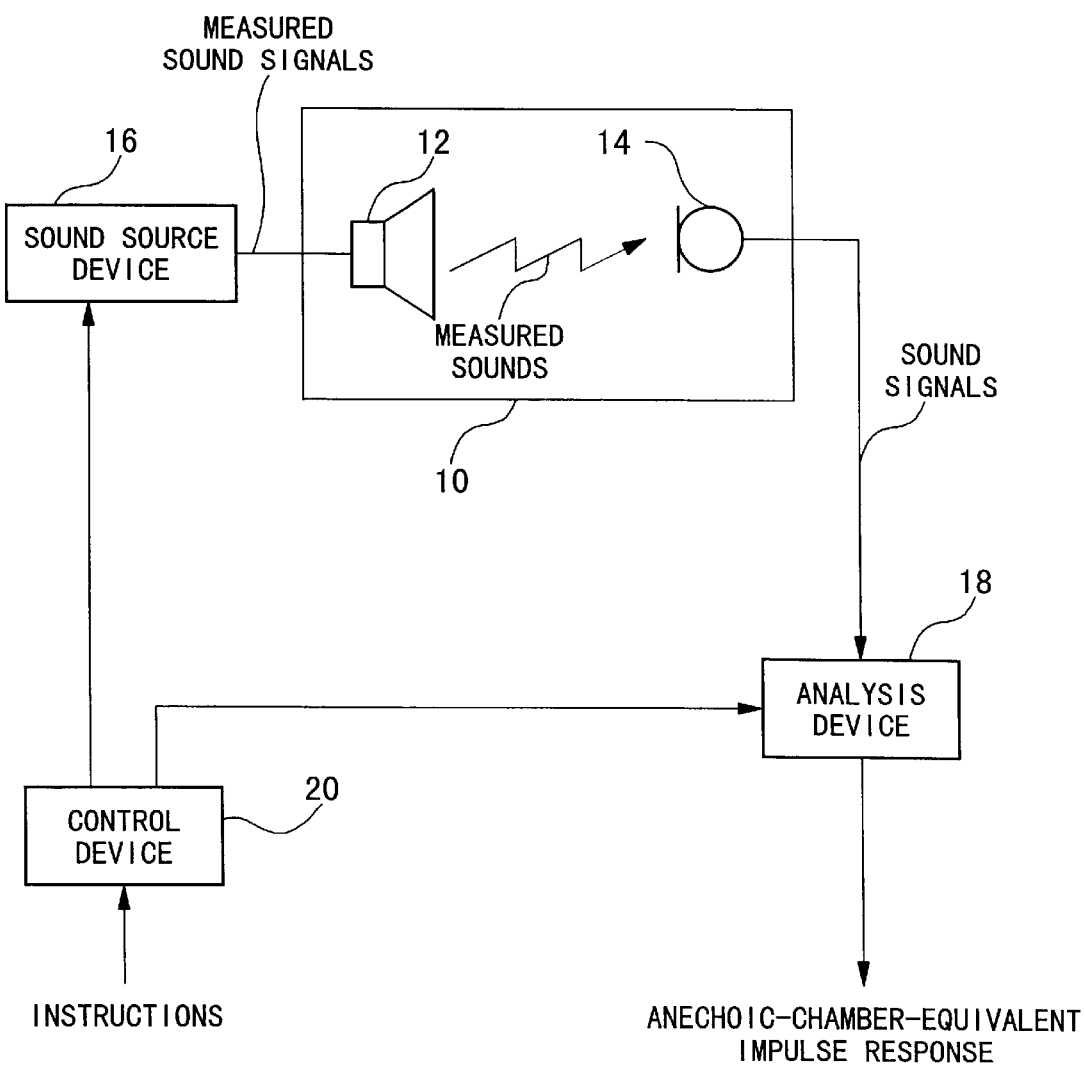
FIG. 2 is a block diagram showing an outline of a system that actualizes the impulse response measuring method.

FIG. 2 is a block diagram showing an outline of a system that actualizes an impulse response measuring method in accordance with embodiment of the invention. In FIG. 2, an echo chamber 10 corresponds to a normal room of a normal building, for example. In the echo chamber 10, a speaker 12 and a microphone 14 are adequately arranged. A sound source device 16 outputs a variety of measured sound signals for measurement of impulse responses, such as impulse signals, band signals and TSP signals (where "TSP" is an abbreviation for "Time Stretched Pulse"). So, the speaker 12 produces measured sounds corresponding to the measured sound signals. Then, the measured sounds are collected by the microphone 14 to produce sound signals. An analysis device 18 inputs the sound signals so as to perform various kinds of calculations on the sound signals. Thus, the analysis device 18 outputs data representing analysis results of the sounds to the external (not shown). A control device 20 receives instructions from the external to drive the sound source device 16 and to control the analysis device 18.

Next, a description will be given with respect to procedures of the impulse response measuring method, which is performed using the system of FIG. 2 in accordance with the embodiment of the invention.

The present embodiment uses a number of parameters and data, which are defined as follows:

$F_s$: sampling frequency of impulse response data.

$h_k$: a string of samples of impulse responses measured in the echo chamber, wherein k=0, 1, ..., N−1 (where 'N' is the second power of 2), while $N/F_s$ denotes an overall measurement time length and N denotes a number of samples.

$H_k$: a string of complex data, which are obtained on the axis of frequency by performing Fourier transform on the impulse responses $h_k$ and which are arranged at frequency points k (where k=0, 1, ..., N−1), which differ from each other by a constant frequency difference $F_s/N$.

$R_e(H_k)$: a string of data corresponding to real parts of the complex data $H_k$.

$I_m(H_k)$: a string of data corresponding to imaginary parts of the complex data $H_k$.

$H_i$: complex data at a frequency point $f_i$ corresponding to a number i counted from the top of the complex data $H_k$, wherein i denotes an index number where i=0, 1, ..., N−1.

$R_e(H_i)$: a real part of the complex data $H_i$.

$I_m(H_i)$: an imaginary part of the complex data $H_i$.

$B_w$: a frequency bandwidth for producing an average value, wherein $B_w$ is $2^{1/X}$, i.e., bandwidth of 1/X octave, where a value of X can be arbitrarily set at any values such as 3, 6, 12, for example.

$R_e(H_j)$: data belonging to the bandwidth $B_w$ within the real part $R_e(H_j)$ of the complex data Hi.

$I_m(H_j)$: data belonging to the bandwidth $B_w$ within the imaginary part $I_m(H_i)$ of the complex data $H_i$.

n: a number of frequency points, which is variable and which are contained in the bandwidth $B_w$.

$R_e(H'_i)$: average data to be substituted for the real part $R_e(H_i)$.

$I_m(H'_k)$: average data to be substituted for the imaginary part $I_m(H_i)$.

$R_e(H'_k)$: a string of average data $R_e(H'_i)$.

$I_m(H'_k)$: a string of average data $I_m(H'_i)$.

$I_m(H'_k)$: a string of complex data which are produced by combining the strings of the average data $R_e(H'_k)$ and $I_m(H'_k)$ together.

$h_{k0}$: data on an axis of time, which are obtained by performing inverse Fourier transform on the string of complex data $H'_k$, wherein $h_{k0}$ denotes a string of samples of the anechoic-chamber-equivalent impulse response which matches with the string of samples of the impulse response measured in the echo chamber.

Figure 1:
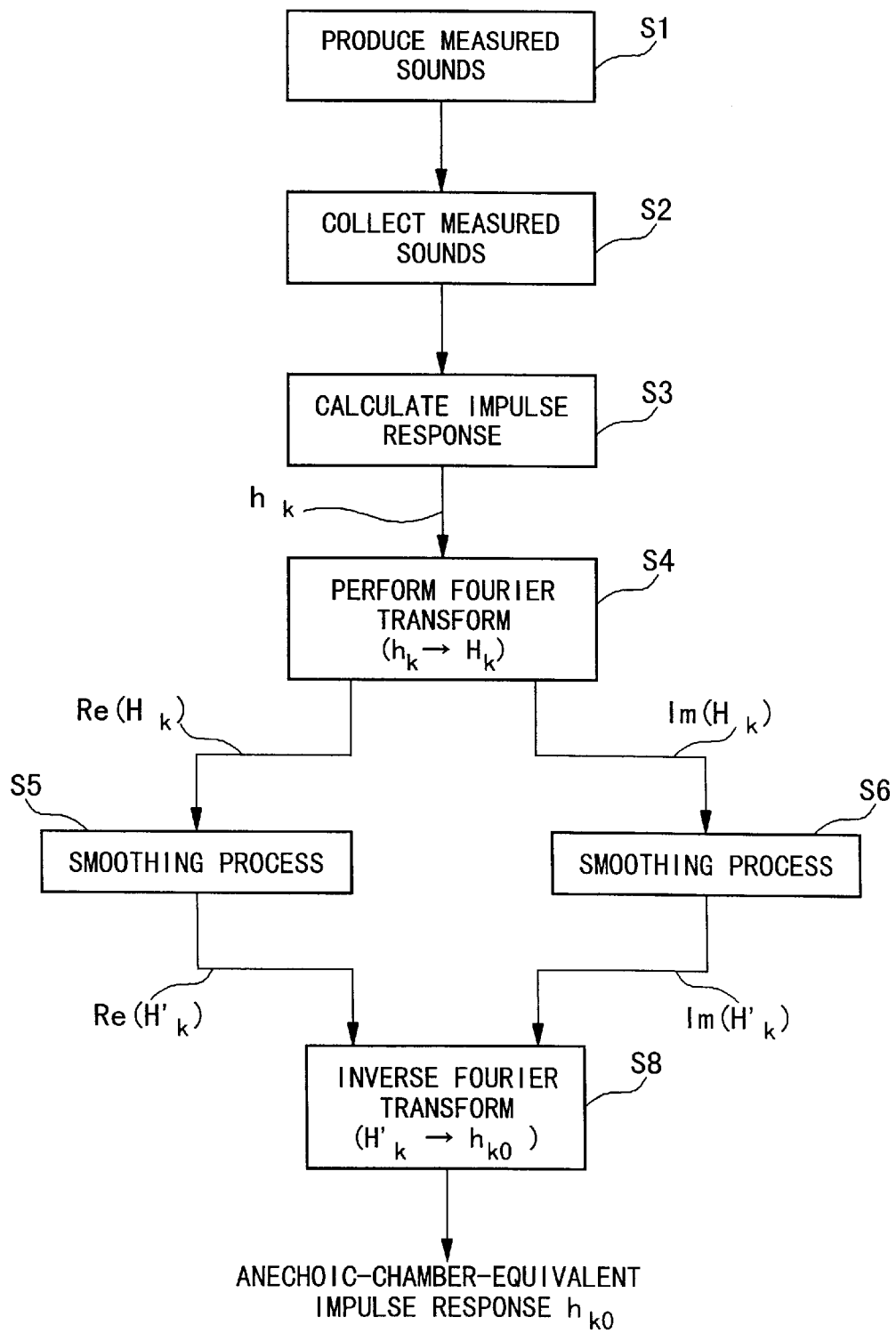
FIG. 1 is a flowchart showing procedures of an impulse response measuring method in accordance with a preferred embodiment of the invention.

FIG. 1 shows an outline of the procedures of the impulse response measuring method. In FIG. 2, when the control device 20 instructs the sound source device 16 to output measured sound signals, the speaker 12 produces measured sounds corresponding to the measured sound signals in step S1. The measured sounds are collected by the microphone 14 to produce sound signals in step S2. The analysis device 18 inputs the sound signals so as to convert them to digital signals in response to the sampling frequency $F_s$. In step S3, the analysis device 18 produces the impulse response $h_k$ based on a number of data of N samples, which emerge after a timing just before a rise of the impulse response and which are stored in a memory (not shown). Herein, the memory stores the data belonging to a time of $N/F_s$. In step S4, the impulse response $h_k$ is subjected to Fourier transform to produce the complex data $H_k$ consisting of the real part $R_e(H_k)$ and the imaginary part $I_m(H_k)$ on the axis of frequency. Smoothing processes are performed respectively on the real part $R_e(H_k)$ and the imaginary part $I_m(H_k)$ of the complex data $H_k$ in steps S5 and S6, which produce a smoothed real part $R_e(H'_k)$ and a smoothed imaginary part $I_m(H'_k)$ respectively. Those smoothed parts are combined together to form "smoothed" complex data $H'_k$. In step S7, the smoothed complex data $H'_k$ are subjected to inverse Fourier transform to produce data $h_{k0}$ on the axis of time. The data $h_{k0}$ is output as impulse response data of the speaker 12 or the microphone 14 to be placed in the anechoic chamber.

Figure 3:
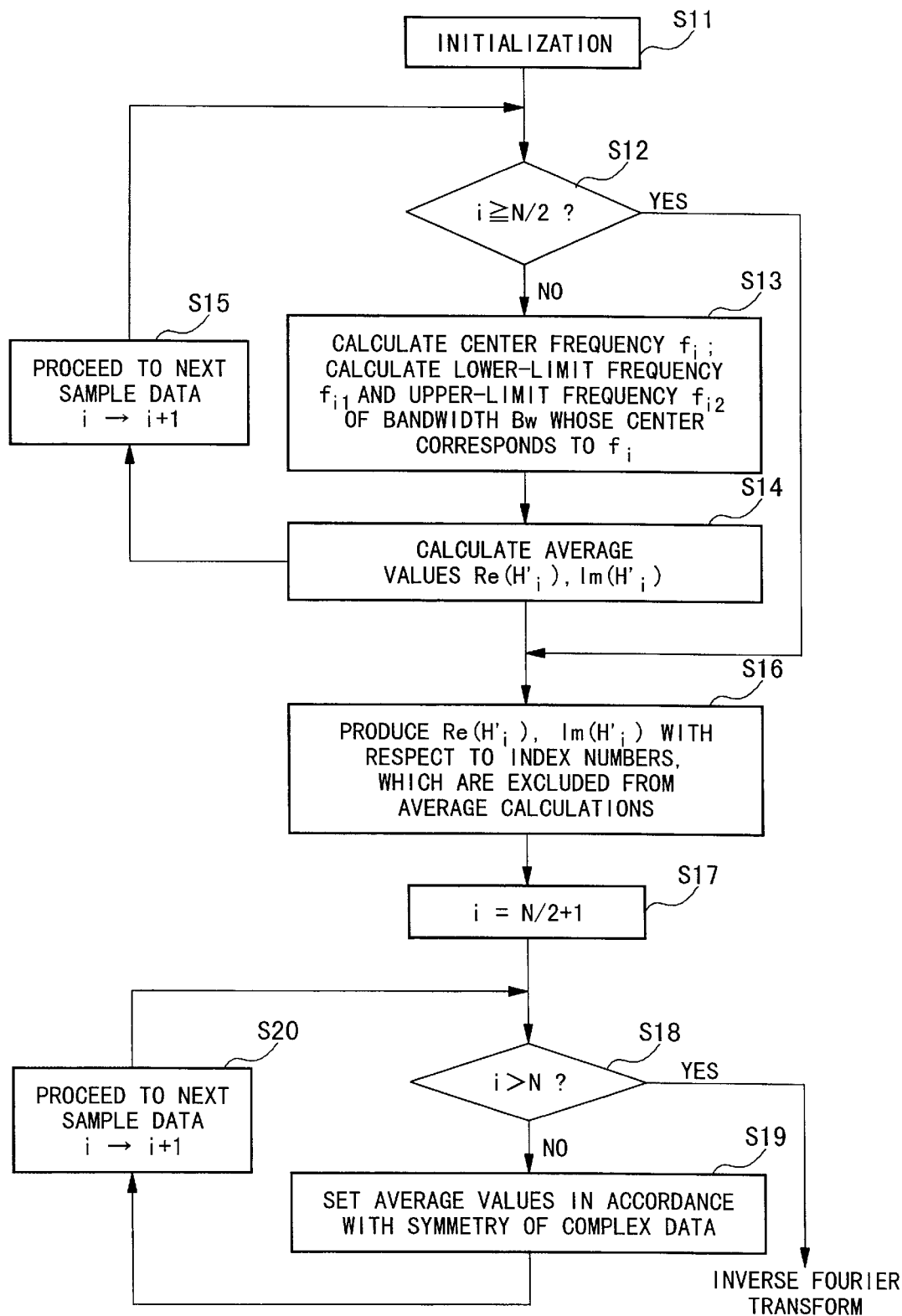
FIG. 3 is a flowchart showing a concrete example of a smoothing process, which is performed with respect to real parts and imaginary parts of complex data respectively.

FIG. 3 shows a concrete example of the smoothing processes of steps S5 and S6, which are performed respectively on the real part $R_e(H_k)$ and the imaginary part $I_m(H_k)$ with respect to the "N" complex data $H_k$. Herein, the real part $R_e(H_k)$ has property of line symmetry with N/2, while the imaginary part $I_m(H_k)$ has property of point symmetry with N/2. Using those properties, average calculations are performed respectively on the real part $R_e(H_k)$ and the imaginary part $I_m(H_i)$ with respect to a first half of the index numbers, i.e., i=1, 2, ..., N/2−1. Herein, the average calculations are performed with regard to a prescribed range of frequencies between a lowest frequency $f_1$ and a highest frequency $f_{N/2-1}$. Results of average calculations for a second half of the index numbers (i.e., i=N/2+1, N/2+2, ..., N−1) are produced using results of the average calculations for the first half of the index numbers. Incidentally, data regarding the index numbers of i=0 and N/2 are excluded from the data used for the average calculations.

In step S11 shown in FIG. 3, initialization is performed with respect to areas for addition of the index numbers and data used for the average calculations. An initial value of the index number i is "1". Then, steps S12, S13, S14 and S15 are performed to produce average values of $R_e(H_i)$ and $I_m(H_i)$ with respect to the first half of the index numbers, i.e., i=1, 2, ..., N/2−1. FIG. 4 shows a content of a process for calculating an average value with respect to one index number i. At first, the present system calculates a frequency $f_i$ with regard to the index number i in accordance with an equation as follows:

$$f_i = i \times \frac{F_s}{N}$$

In addition, the present system calculates a lower-limit frequency $f_{i1}$ and an upper-limit frequency $f_{i2}$ of a bandwidth $B_w$, whose center corresponds to the frequency $f_i$, in accordance with equations as follows:

$$f_{i1} = \frac{f_i}{B_w^{1/2}}$$

Next, the present system calculates index numbers i1, i2 for the frequencies $f_{i1}$, $f_{i2}$ in accordance with equations as follows:

$$i_1 = \frac{f_{i1}}{F_s} \times N$$

$$i_2 = \frac{f_{i2}}{F_s} \times N$$

In the above equations, fractions are uniformly rounded down with respect to the index number $i_1$, while fractions are uniformly rounded up with respect to the index number $i_2$.

Next, the present system calculates an average value $R_e(H'_i)$ for the real parts and an average value $I_m(H'_i)$ for the imaginary parts with respect to "n" frequency points (where $n=i_2-i_1+1$), which are arranged in a range between the index numbers $i_1$ and $i_2$, in accordance with equations as follows:

$$R_e(H'_i) = \frac{\sum R_e(H_j)}{n}$$

$$I_m(H'_i) = \frac{\sum I_m(H_j)}{n}$$

Then, the present system substitutes the calculated average values $R_e(H'_i)$, $I_m(H'_i)$ for the original values $R_e(H_i)$, $I_m(H_i)$ respectively.

The aforementioned operations are performed with respect to each of the frequency points. In a range where $i_1 \leq 0$ shown in FIG. 5A in proximity to a lowest frequency of a frequency range used for the calculations, "invalid" data exist in the bandwidth $B_w$ used for the calculations to produce the average values. For this reason, the index number $i_1$ is fixedly set at "1" (i.e., $i_1=1$) as shown in FIG. 5B, so that the invalid data will not be entered into the bandwidth by setting the upper-limit frequency $f_{i2}$ such that the frequency $f_i$ coincides with the center of the bandwidth. In FIG. 5B, a new bandwidth $B_w'$ is created by narrowing the original bandwidth $B_w$. In this case, the present system calculates the index number $i_2$ for the upper-limit frequency $f_{i2}$ as follows:

$$f_{i1} = i_1 \times \frac{F_s}{N}$$

$$f_{i1} \times f_{i2} = \frac{f_i}{B_w^{1/2}} \times f_i \times B_w^{1/2} = f_i^2$$

From the above equation, the present system calculates the upper-limit frequency $f_{i2}$, which is put into a following equation to calculate the index number $i_2$.

$$i_2 = \frac{f_{i2}}{F_s} \times N$$

Incidentally, fractions are uniformly rounded up with respect to the index number $i_2$. Then, the present system calculates average values $R_e(H'_i)$, $I_m(H'_i)$ for the real parts and imaginary parts with respect to the index numbers $i_1$ and $i_2$.

In a range where $i_2 \leq N/2$ shown in FIG. 6A in proximity to a highest frequency of the frequency range used for the calculations, the index number $i_2$ is fixedly set to establish a relationship of "$i_2=N/2-1$" as shown in FIG. 6B. Herein, a lower-limit frequency $f_{i1}$. is set such that a frequency $f_i$ corresponds to center of a bandwidth $B_w'$ shown in FIG. 6B. Herein, the bandwidth $B_w'$ is narrowed as compared with the original bandwidth $B_w$. In this case, the index number $i_1$ for the lower-limit frequency $f_{i1}$ is calculated as follows:

$$f_{i2} = i_2 \times \frac{F_s}{N}$$

$$i_1 = \frac{N}{2} - 1$$

$$f_{i1} \times f_{i2} = f_i^2$$

Based on the above equation, the lower-limit frequency $f_{i1}$ is calculated and is put into a following equation to produce the index number $i_1$.

$$i_1 = \frac{f_{i1}}{F_s} \times N$$

Incidentally, fractions are uniformly rounded down with respect to the index number $i_1$. Then, the present system calculates average values $R_e(H'_i)$, $I_m(H'_i)$ for real parts and imaginary parts with respect to the index numbers $i_1$ and $i_2$.

In a case where $i=1$, $f_{i1}=f_{i2}=f_i$, so that the bandwidth $B_w$ is zero. In this case, average values for the real parts and imaginary parts are calculated with respect to the frequency $f_i$. Same calculations are performed with respect to a case where $i=N/2-1$. Therefore, if the average values calculated for the cases where $i=1$ and $i=N/2-1$ are stored in advance and are used in step S16, it is possible to reduce the calculations for producing the average values. In this case, a new initial value of "$i=2$" is set for the step S11 (see FIG. 3), while a content of step S12 is changed to "$i \geq N/2-1$?".

As described above, average values are calculated respectively for the frequency points with respect to the index numbers, i.e., $i=1, 2, \ldots, N/2-1$. Then, the present system sets $R_e(H'_i)$, $I_m(H'_i)$ with respect to the prescribed index numbers of $i=0$ and $i=N/2$, which are excluded in the calculations for producing the average values, as follows:

$R_e(H'_0)=R_e(H_0)$, $I_m(H'_0)=0$ $R_e(H'_{N/2})=R_e(H_{N/2})$, $I_m(H'_{N/2})=0$

If average values are not calculated with respect to the index numbers of $i=1$ and $i=N/2-1$, the present system sets $R_e(H'_i)$, $I_m(H'_i)$ with respect to those index numbers, as follows:

$R_e(H'_1)=R_e(H_1)$, $I_m(H'_i)=I_m(H_1)$ $R_e(H'_{N/2-1})=R_e(H_{N/2-1})$, $I_m(H'_{N/2-1})=I_m(H_{N/2-1})$

Using the symmetry of the complex data, average values, which have been already calculated with respect to a range of $0<i<N/2$, are used for calculations to produce $R_e(H'_i)$, $I_m(H'_i)$ with respect to a range of $N/2<i<N$. That is, an initial value of $i=N/2+1$ is set to the index number $i$ in step S17, then, the present system calculates $R_e(H'_i)$, $I_m(H'_i)$ with respect to the index numbers (i.e., $i=N/2+1, N/2+2, \ldots, N-1$) in steps S18, S19 and S20 in accordance with relationships as follows:

$R_e(H'_i)=R_e(H'_{N-i})$ $I_m(H'_i)=-I_m(H'_{N-i})$

As described above, the present system calculates strings of average data $R_e(H'_k)$, $I_m(H'_k)$ with respect to all the index numbers $i=0, 1, \ldots, N-1$ (i.e., frequencies 0 to $F_s$). Those strings of the average data are combined together to form a string of complex data $H'_k$, which is subjected to inverse Fourier transform (see step S8 in FIG. 1) to produce data $h_{k0}$ on the axis of time. Such data $h_{k0}$ are output as impulse response data of the speaker 12 or microphone 14 in the anechoic chamber.

Figure 8:
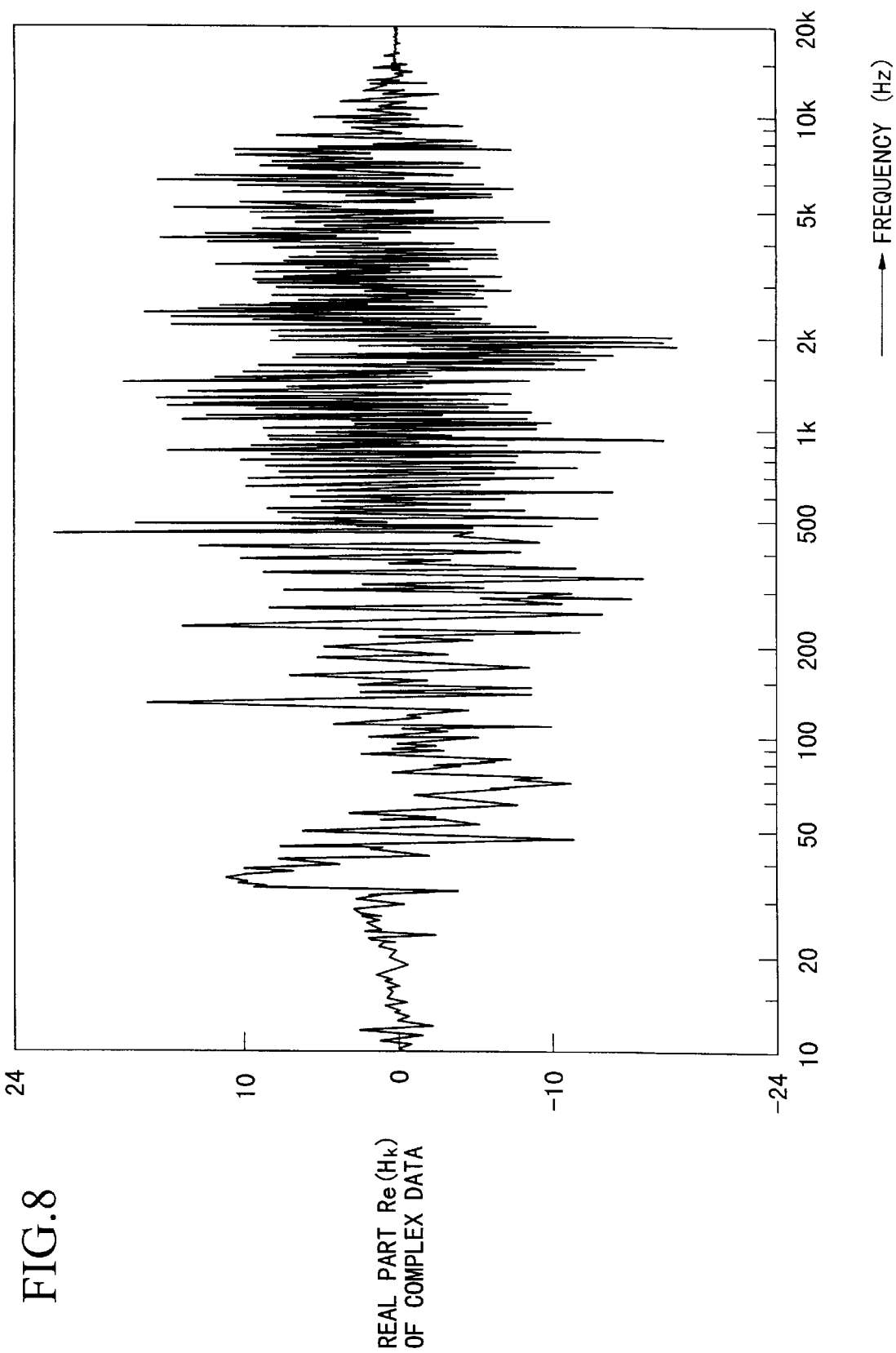
FIG. 8 is a graph showing variations of real parts $R_e(H_k)$ of complex data $H_k$, which are obtained by performing Fourier transform on the impulse response $h_k$.
Figure 9:
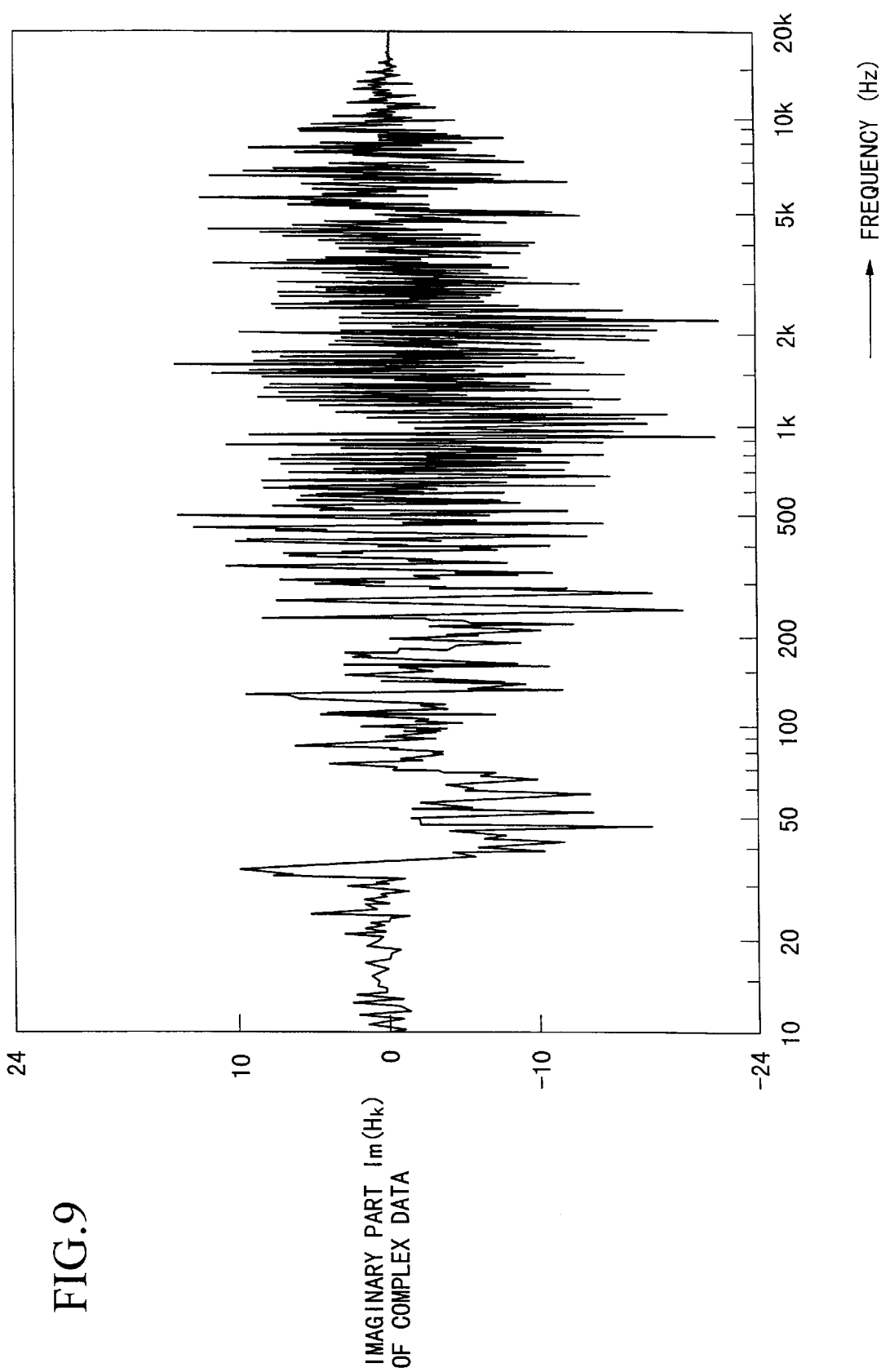
FIG. 9 is a graph showing variations of imaginary parts $I_m(H_k)$ of the complex data $H_k$.
Figure 10:
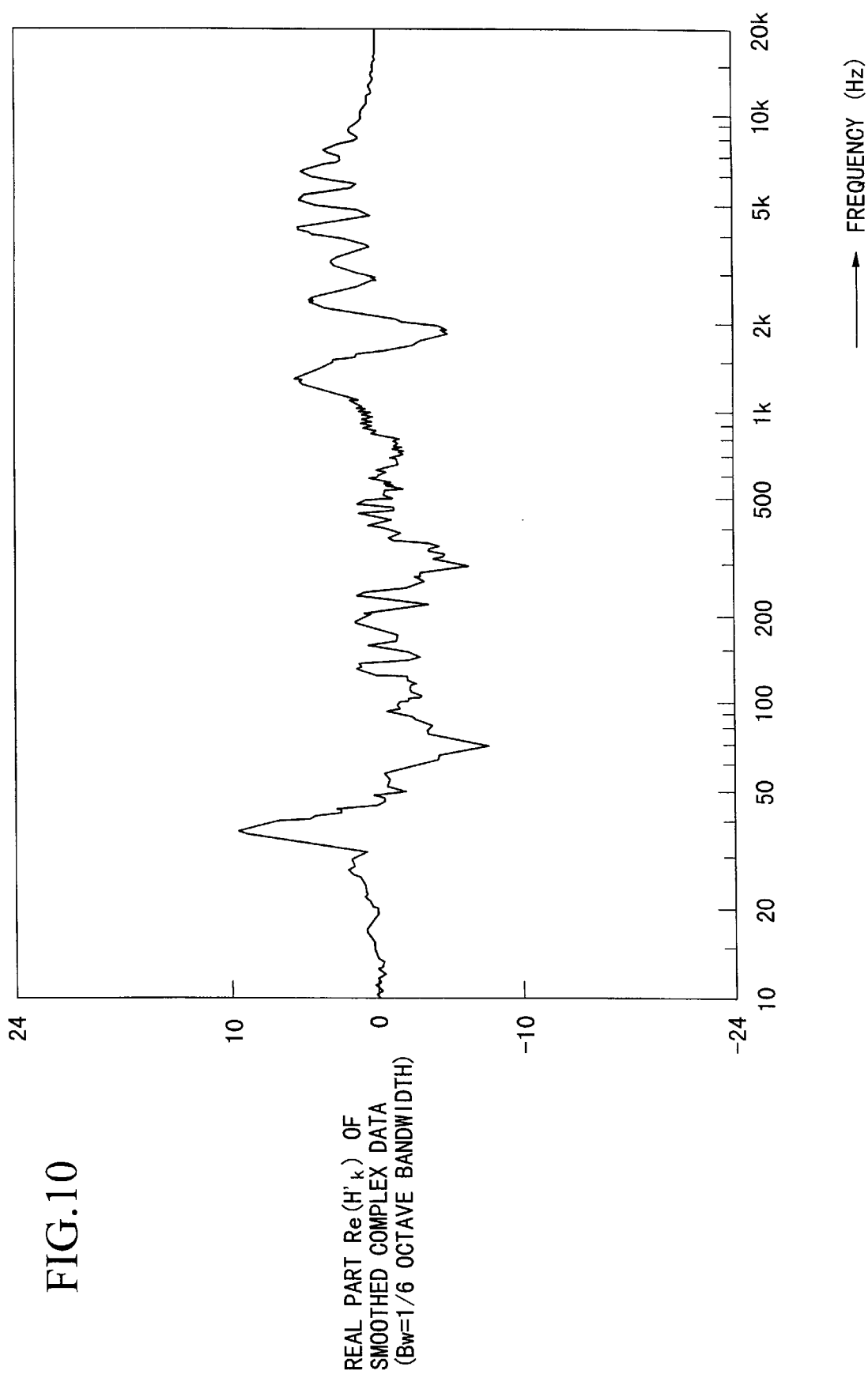
FIG. 10 is a graph showing variations of average data $R_e(H'_k)$, which are obtained by smoothing the real parts $R_e(H_k)$ with respect to a bandwidth $B_w$ corresponding to ⅙ octave band.
Figure 11:
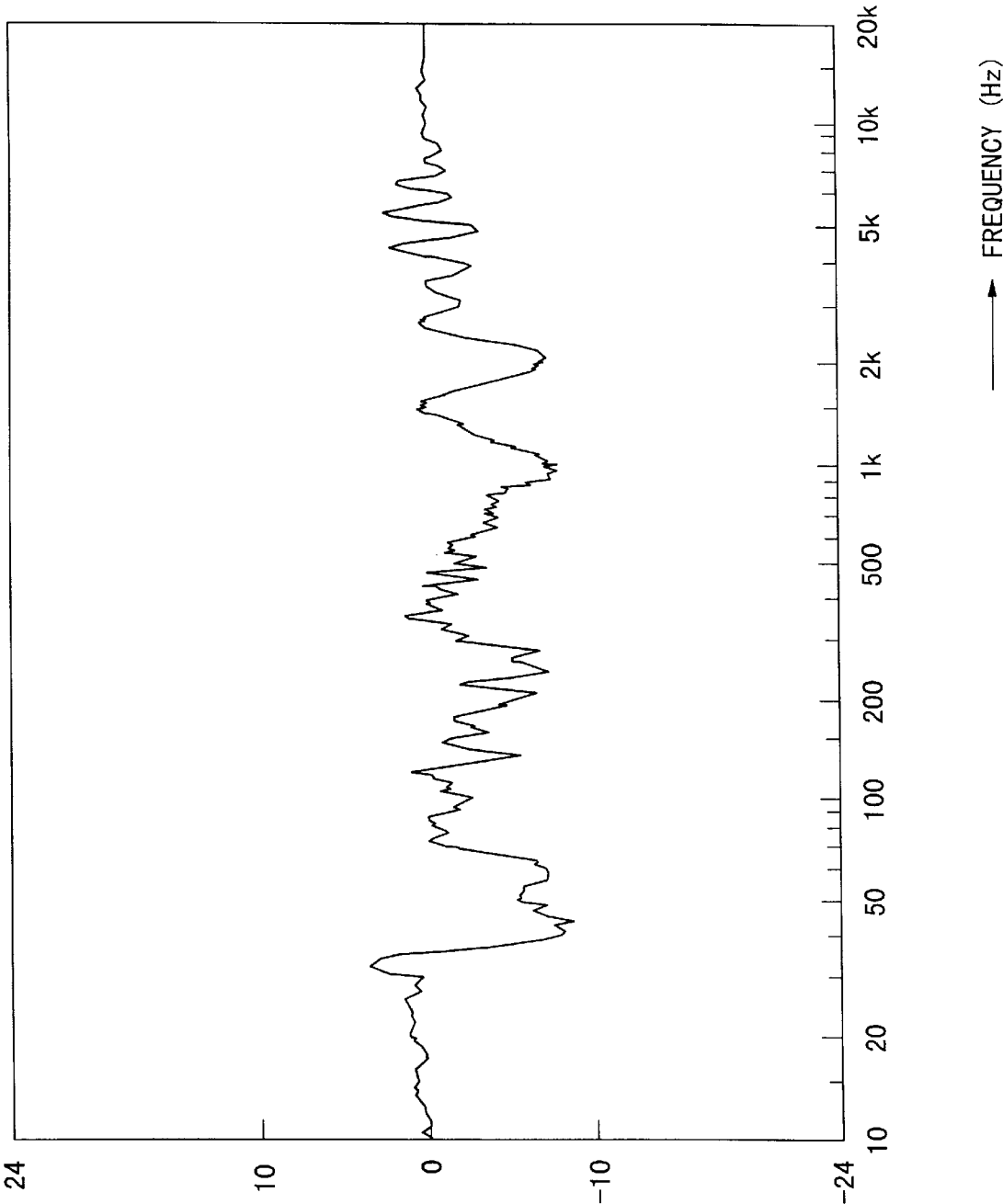
FIG. 11 is a graph showing variations of average data $I_m(H'_k)$, which are obtained by smoothing the imaginary parts $I_m(H'_k)$.
Figure 12:
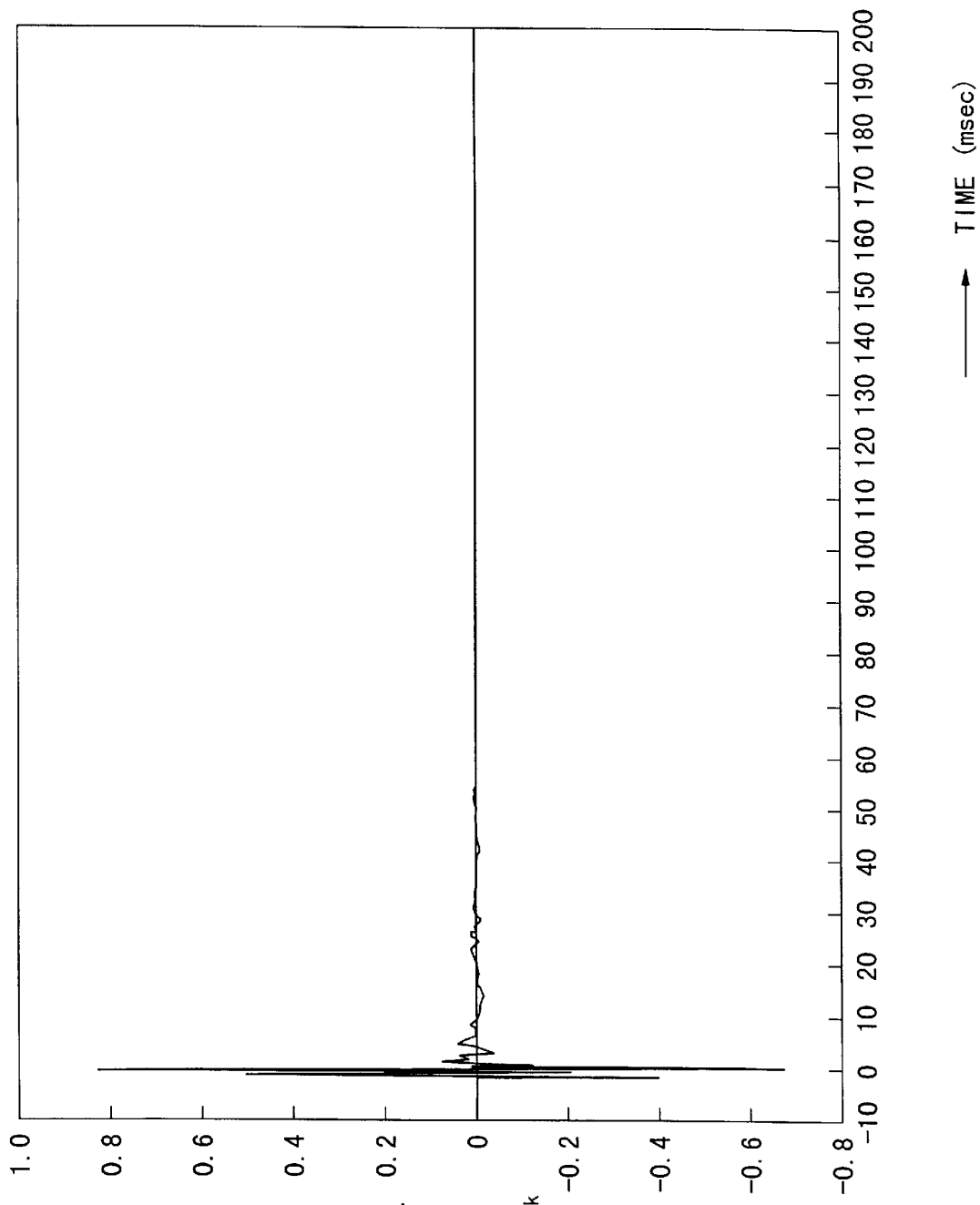
FIG. 12 is a graph showing anechoic-chamber-equivalent impulse response $h_{k0}$, which is obtained by performing inverse Fourier transform on complex data $H'_k$ formed by combining the average data $R_e(H'_k)$, $I_m(H'_k)$ together.

FIGS. 7 to 12 show results of experiments in measurement of impulse responses, which are measured by the system of FIG. 2 in accordance with the aforementioned processes and operations which are described heretofore in conjunction with FIGS. 1, 3, 4, 5A, 5B, 6A and 6B. Specifically, FIG. 7 shows impulse response $h_k$ which is actually measured in the echo chamber. FIG. 8 shows real parts $R_e(H_k)$ of complex data $H_k$ which are obtained by performing inverse Fourier transform on the impulse response $h_k$, with respect to the axis of frequency. FIG. 9 shows imaginary parts $I_m(H_k)$ of the complex data $H_k$. In addition, FIG. 10 shows average data $R_e(H'_k)$, which are obtained by performing the smoothing process on the real parts $R_e(H_k)$ with respect to a prescribed bandwidth $B_w$ corresponding to ⅙ octave band. FIG. 11 shows average data $I_m(H'_k)$, which are obtained by performing the smoothing process on the imaginary parts $I_m(H_k)$. Further, FIG. 12 shows impulse response $h_{k0}$, which is obtained by performing inverse Fourier transform on complex data $H'_k$ formed by combining the real parts $R_e(H'_k)$ and the imaginary parts $I_m(H'_k)$. As compared with the original impulse response $h_k$ shown in FIG. 7, the impulse response $h_{k0}$ is formed such that direct sound components remain without being changed substantially but reverberation components are removed. So, it is possible to obtain the "anechoic-chamber-equivalent" impulse response.

The aforementioned embodiment is designed such that "1/X" octave bandwidth (i.e., each of bandwidths whose ratios in frequencies are constant) is set to the bandwidth $B_w$ used for the calculations to produce average values. It is possible to modify the present embodiment such that each of bandwidths whose differences in frequencies are constant is set to the bandwidth $B_w$. That is, the present embodiment is designed in such a way that the center frequency $f_i$ is set to establish a constant frequency ratio for the frequencies $f_{i1}$, $f_{i2}$ defining the bandwidth $B_w$ in accordance with an equation as follows:

$$f_i = (f_{i1} \times f_{i2})^{1/2}$$

However, it is possible to modify the present embodiment such that the center frequency $f_i$ is set to establish a constant frequency difference for the frequencies $f_{i1}$, $f_{i2}$ of the bandwidth $B_w$ in accordance with an equation as follows:

$$f_i = \frac{f_{i1} + f_{i2}}{2}$$

In addition, the present embodiment is designed such that the frequency points used for calculations of average values are set with a constant frequency difference, as follows:

$$f_{i+1} - f_i = f_{i+2} - f_{i+1} = \frac{F_s}{N}$$

However, it is possible to modify the present embodiment such that the frequency points are set with a constant frequency ratio, as follows:

$$\frac{f_{i+1}}{f_i} = \frac{f_{i+2}}{f_{i+1}}$$

Further, the present embodiment is designed such that a number of frequency points is set identical to a number of sampling points of the impulse response, i.e., N. This is because in case of FFT (i.e., Fast Fourier Transform) employed as the Fourier transform performed in the present embodiment, it is the simplest way that values of "N" points on the axis of frequency are calculated based on values of "N" samples on the axis of time in general. If engineers do not pay attention to simplicity of the calculations, a number of samples is not necessarily set identical to a number of points. However, if the number of samples differs from the number of points, the engineers should pay attention to the length of the impulse response finally calculated, which may be changed when data are subjected to inverse FFT calculations to restore the characteristic on the axis of time.

The present embodiments sets a frequency rage between $f_1$ and $f_{N/2-1}$ for the calculations to produce the average values. It is possible to set another frequency range, e.g., a frequency range between $f_{N/2+1}$ and $f_{N-1}$. In this case, it is possible to repeatedly use average values calculated for the frequency range between $f_{N/2+1}$ and $f_{N-1}$ for calculations to produce average values with respect to the frequency range between $f_1$ and $f_{N/2-1}$ on the basis of the symmetry of the complex data. Incidentally, the calculations are not performed with respect to prescribed frequencies $f_0$, $f_{N/2}$, so that data of those frequencies are used directly without being substituted.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An impulse response measuring method comprising the steps of:

generating measured sounds for measurement of impulse response by a speaker located in an echo chamber;

converting the measured sounds to sound signals by a microphone located in the echo chamber;

producing an impulse response based on the sound signals;

converting the impulse response to complex data consisting of real parts and imaginary parts with respect to an axis of frequency;

performing a smoothing process on the complex data to produce smoothed complex data with respect to the axis of frequency; and converting the smoothed complex data to time domain data regarding an axis of time, wherein the time domain data represent an anechoic-chamber-equivalent impulse response, which substantially corresponds to the impulse response that would be measured in an anechoic chamber.

2. The impulse response measuring method according to claim 1, wherein a plurality of frequency points are set and arranged on the axis of frequency with respect to a prescribed frequency range in such a way that the frequency points differ from each other by a prescribed frequency difference or by a prescribed frequency ratio, and wherein the smoothing process is repeatedly performed with respect to each of the plurality of frequency points in the prescribed frequency range in such a way that average data are calculated based on the real parts and the imaginary parts of the complex data calculated for a number of frequency points belonging to a prescribed bandwidth defined by frequencies which are set before and after each frequency point, so that the average data are combined together to form the smoothed complex data, which are substituted for data of each frequency point representative of the prescribed bandwidth.

3. The impulse response measuring method according to claim 2, wherein the prescribed bandwidth is set such that each frequency point whose data are substituted substantially corresponds to a center frequency of the prescribed bandwidth used for calculations of the average data.

4. An impulse response measuring method comprising the steps of:
  generating measured sounds for measurement of impulse response by a speaker located in an echo chamber;
  converting the measured sounds to sound signals by a microphone located in the echo chamber;
  producing an impulse response based on the sound signals;
  converting the impulse response to complex data consisting of real parts and imaginary parts with respect to an axis of frequency;
  setting and arranging a plurality of frequency points on the axis of frequency with respect to a prescribed frequency range so that the frequency points differ from each other by a prescribed frequency difference or by a prescribed frequency ratio;
  performing a smoothing process on the complex data to produce smoothed complex data with respect to the axis of frequency, wherein
    the smoothing process is repeatedly performed with respect to each of the plurality of frequency points in the prescribed frequency range so that average data are calculated based on the real parts and the imaginary parts of the complex data calculated for a number of frequency points belonging to a prescribed bandwidth defined by frequencies which are set before and after each frequency point, and
    the average data are combined together to form the smoothed complex data, and the smoothed complex data are substituted for the complex data of each frequency point representative of the prescribed bandwidth; converting the smoothed complex data to time data regarding an axis of time,
    whereby the time data are used as anechoic-chamber-equivalent impulse response, which substantially corresponds to the impulse response actually measured in the echo chamber;
  changing a bandwidth whose lower-limit frequency is lower than a lowest frequency of the frequency range used for the calculations of the average data so that the lower-limit frequency of the bandwidth coincides with the lowest frequency of the frequency range or a frequency point slightly higher than the lowest frequency of the frequency range while each frequency point whose data are substituted substantially coincides with a center frequency of the bandwidth; and
  changing a bandwidth whose upper-limit frequency is higher than a highest frequency of the frequency range used for the calculations of the average data so that the upper-limit frequency of the bandwidth coincides with the highest frequency of the frequency range or a frequency point slightly lower than the highest frequency of the frequency range while each frequency point whose data are substituted substantially coincides with a center frequency of the bandwidth.

5. The impulse response measuring method according to claim 4, wherein the prescribed bandwidth is set so that each frequency point whose data are substituted substantially corresponds to a center frequency of the prescribed bandwidth used for calculations of the average data.

6. The impulse response measuring method according to claim 4, wherein the frequency range used to calculate the average data is divided, with respect to the axis of frequency, into
  a first range lying between (a) a first frequency point, corresponding to zero frequency, and (b) a second frequency point, corresponding to a half of a sampling frequency used for the measurement of the impulse response in the echo chamber, and
  a second range lying between (a) the second frequency point and (b) a third frequency point, corresponding to the sampling frequency, so that the complex data are repeatedly used for another one of the first and second ranges according to symmetry of the complex data,
  whereby the smoothing process is reduced in calculations with respect to the frequency range in total.

7. An impulse response measuring method comprising the steps of:
  generating measured sounds for measurement of impulse response by a speaker located in an echo chamber;
  converting the measured sounds to sound signals by a microphone located in the echo chamber;
  producing an impulse response based on the sound signals;
  converting the impulse response to complex data consisting of real parts and imaginary parts with respect to an axis of frequency;
  setting and arranging a plurality of frequency points on the axis of frequency with respect to a prescribed frequency range so that the frequency points differ from each other by a prescribed frequency difference or by a prescribed frequency ratio;
  performing a smoothing process on the complex data to produce smoothed complex data with respect to the axis of frequency, wherein
    the smoothing process is repeatedly performed with respect to each of the plurality of frequency points in the prescribed frequency range so that average data are calculated based on the real parts and the imaginary parts of the complex data calculated for a number of frequency points belonging to a prescribed bandwidth defined by frequencies which are set before and after each frequency point, and
    the average data are combined together to form the smoothed complex data, and the smoothed complex data are substituted for the complex data of each frequency point representative of the prescribed bandwidth, wherein the frequency range is divided with respect to the axis of frequency into
    a first range lying between (a) a first frequency point, corresponding to zero frequency, and (b) a second frequency point, corresponding to a half of a sampling frequency used for the measurement of the impulse response in the echo chamber, and
    a second range lying between (a) the second frequency point and (b) a third frequency point, corresponding to the sampling frequency, so that the complex data are repeatedly used for another one of the first and second ranges in accordance with symmetry of the complex data, whereby the smoothing process is reduced in calculations with respect to the frequency range in total; and
  converting the smoothed complex data to time data regarding an axis of time, whereby the time data are used as anechoic-chamber-equivalent impulse response, which substantially corresponds to the impulse response actually measured in the echo chamber.

8. The impulse response measuring method according to claim 7, wherein the prescribed bandwidth is set so that each frequency point whose data are substituted substantially corresponds to a center frequency of the prescribed bandwidth used for calculations of the average data.

9. The impulse response measuring method according to claim 1, wherein the anechoic-chamber-equivalent impulse response is used as impulse response simulated for the speaker or the microphone in the anechoic chamber.

10. An impulse response measuring method comprising the steps of:

generating measured sounds by a speaker in an echo chamber;

detecting the measured sounds and converting to sound signals by a microphone located in the echo chamber;

calculating an impulse response based on the sound signals;

performing a Fourier transform on the impulse response to produce complex data consisting of real parts and imaginary parts with respect to an axis of frequency;

performing a smoothing process on the real parts of the complex data to produce first average data;

performing a smoothing process on the imaginary parts of the complex data to produce second average data;

combining the first average data and the second average data together to form smoothed complex data; and performing an inverse Fourier transform on the smoothed complex data to produce an anechoic-chamber-equivalent impulse response, which substantially corresponds to the impulse response that would be measured in anechoic chamber.

11. The impulse response measuring method according to claim 10, wherein the smoothing process is respectively performed on the real parts and the imaginary parts of the complex data with respect to each of frequency points which are arranged at equal intervals on the axis of frequency within a prescribed frequency range.

12. An impulse response measuring method comprising the steps of:

generating measured sounds by a speaker in an echo chamber;

detecting the measured sounds and converting to sound signals by a microphone located in the echo chamber;

calculating an impulse response based on the sound signals;

performing a Fourier transform on the impulse response to produce complex data consisting of real parts and imaginary parts with respect to an axis of frequency;

performing a smoothing process on the real parts of the complex data to produce first average data;

performing a smoothing process on the imaginary parts of the complex data to produce second average data, wherein the smoothing process is performed respectively on the real parts and the imaginary parts of the complex data to produce a first average data and a second average data in connection with bandwidths, each of which is defined by a lower-limit frequency and an upper-limit frequency and each of which has a center frequency substantially corresponding to each frequency point;

combining the first average data and the second average data together to form smoothed complex data; and performing an inverse Fourier transform on the smoothed complex data to produce anechoic-chamber-equivalent impulse response, which substantially corresponds to the impulse response measured in the echo chamber.

13. The impulse response measuring method according to claim 12, wherein a first bandwidth whose lower-limit frequency is lower than a lowest frequency of the frequency range is narrowed in such a way that the lower-limit frequency of the first bandwidth is changed to coincide with the lowest frequency of the frequency range or a first frequency point slightly higher than the lowest frequency of the frequency range while a center frequency of the bandwidth substantially corresponds to each frequency point whose data are substituted and which is higher than the first frequency point, while a second bandwidth whose upper-limit frequency is higher than a highest frequency of the frequency range is narrowed in such a way that the upper-limit frequency of the second bandwidth is changed to coincide with the highest frequency of the frequency range or a second frequency point slightly lower than the highest frequency of the frequency range while a center frequency of the second bandwidth substantially coincides with each frequency point whose data are substituted and which is lower than the second frequency point.

* * * * *